Dec. 28, 1937.   R. HALL   2,103,981
EXPANSION JOINT STRUCTURE
Filed June 11, 1936
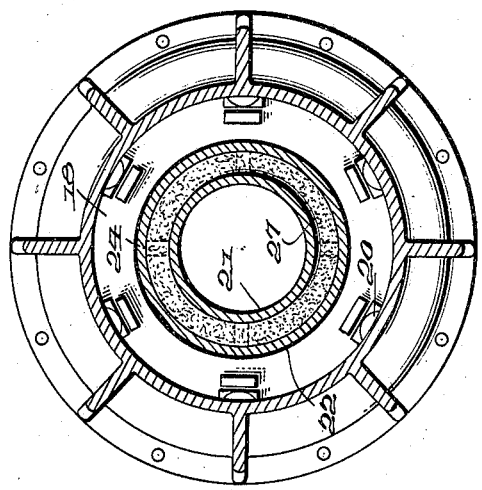
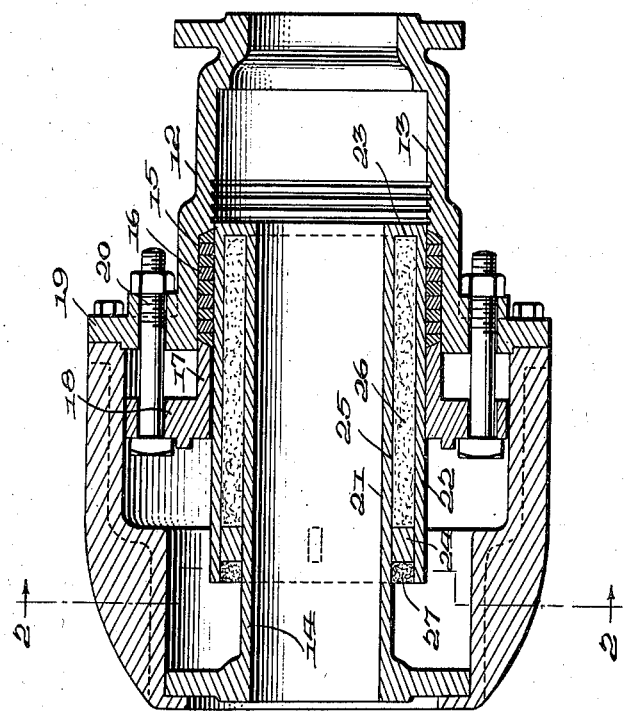
Inventor
Robert Hall,
By Edmund H. Parry Jr.
Attorney Patented Dec. 28, 1937

2,103,981

UNITED STATES PATENT OFFICE 2,103,981

EXPANSION JOINT STRUCTURE

Robert Hall, Lockport, N. Y., assignor to American District Steam Company, North Tonawanda, N. Y., a corporation of New York Application June 11, 1936, Serial No. 84,742

2 Claims. (Cl. 285—162)

This invention relates to expansion structures of the slip joint type which are primarily designed for use with steam or the like systems wherein provision is made to permit the normal expansion, contraction or other tendencies of the pipe line to move.

The subject-matter of the present invention is an improvement over the structure shown in Patent No. 1,367,348 to Eugene L. Barnes dated February 1, 1921. As disclosed in this patent the expansion joint comprises inner and outer relatively slidable members with a packing located therebetween, and one feature described therein is the provision of an air space to provide a heat insulated area between the interior of the inner sliding member and the packing. Provision is also made in the expansion joint for the free circulation of air in and out the space so that the extreme heat from the steam or other fluid within the joint may be dissipated and the destructive effect of such heat on the joint packing thereby materially decreased.

Although, theoretically, an air space provides a good insulation against heat it is difficult in the practical use of the Barnes joint to maintain the desired insulation of the packing against high line temperatures. When the joint is employed in an underground line considerable moisture is encountered. Because the air space of the joint is open such moisture accumulates therein and seriously affects the heat insulating properties of the construction inasmuch as water is a good conductor of heat.

The general object of the present invention is to provide an expansion joint in which the joint packing is permanently and effectively insulated against heat from within the joint. It is a further object to provide an insulating construction for a joint packing which is not adversely affected by moisture, as is true of the Barnes joint, and having lasting insulating properties under all conditions of use.

In order that the invention may be clearly understood I have disclosed one specific embodiment of the same in the accompanying drawing which is merely illustrative.

In the drawing:

Fig. 1 is a view in vertical section of the embodiment of the invention.

Fig. 2 is a view in transverse section on the line 2—2 of Fig. 1.

Referring now to the drawing, the expansion device embodying my invention comprises a joint member 12 having a smoothly bored inner surface 13 adapted to receive an inner cooperating sliding member 14. Located adjacent one end of the bore of the member 12 is an annular recess 15 for the reception of a packing 16, which is held between the inner sliding member 14 and the outer member 12 by means of a packing ring or gland 17. The gland 17 is provided with a flange 18 adapted to cooperate with a flange 19 on the member 12 and by means of suitable bolts 20 maintains the packing ring or gland tightly against the packing to retain it in fixed position.

The inner sliding member 14 is made up of two spaced concentric sleeves 21 and 22 respectively. The inner and outer sleeves are united at one end, preferably the inner end, by a connecting portion 23. Such parts may be cast as an integral unit, or conveniently may be separately formed and welded together. Adjacent the opposite end the sleeves are provided with spacing blocks 24. As shown in Fig. 2 four of these spacing elements may be provided and are arranged inwardly of the open end a slight distance. With such an arrangement the concentric inner and outer walls of the inner joint member 14 will form an annular chamber 25 which is sealed at one end by connecting portion 23. The packing 16 is thus isolated from the heat existing interiorly of the joint.

The annular chamber 25 is filled with a suitable material 26 having high heat insulating properties. Mineral wool may be employed or some other suitable insulation. Cellular concrete or spun glass may also be used. It is considered best, however, to fill the annular space with a packing of asbestos because of the high insulating properties thereof, and its immunity to deterioration under heat. For best results the insulating medium should be loosely packed in the annular chamber 25 and not packed so tightly as to constitute a substantially solid layer.

The insulating material will extend for the entire length of the duplex sleeve construction of the inner joint member. To prevent penetration of moisture the open end of the chamber 25 can be sealed after insertion of the insulation 26 so that the packed chamber will be completely closed and the insulation completely protected in use. For this purpose the insulation may be terminated short of the end extremities of sleeves 21 and 22 and a braided asbestos packing 27 and/or a suitable heat-resistive grouting forced into the annular end space. As shown in Fig. 1, the ends of the spacing blocks 24 may form a seat lending support to such end seal.

I claim:

1. An expansion joint comprising inner and outer sliding joint members, a sealing member between the inner and outer sliding joint members, a chamber extending lengthwise of the inner joint member underlying said sealing member and having an end through which material can be inserted, a packing of insulating material in said chamber, and sealing means closing said end of the chamber of the inner joint member.

2. An expansion joint comprising inner and outer sliding joint members, a sealing member between said sliding members, said inner joint member having a laminated wall structure including an outer metallic section in sliding contact with the sealing member, an intermediate porous section of heat insulating material, an inner metallic section, and sealing means at the ends of the intermediate insulating section.

ROBERT HALL.